United States Patent [19]

Fleming, III

[11] Patent Number: 5,982,358

[45] Date of Patent: *Nov. 9, 1999

[54] METHOD FOR PROVIDING BUTTONS FOR USE WITH MULTIPLE POINTING DEVICES ON A LAPTOP COMPUTER

[75] Inventor: Hoyt A. Fleming, III, Boise, Id.

[73] Assignee: Micron Electronics, Inc., Nampa, Id.

[*] Notice: This patent is subject to a terminal disclaimer.

[21] Appl. No.: 08/931,841

[22] Filed: Sep. 17, 1997

[51] Int. Cl.⁶ ...................................................... G09G 5/08
[52] U.S. Cl. ........................... 345/168; 345/168; 345/173
[58] Field of Search ..................................... 345/168, 169, 345/173, 161, 167, 163, 157; 364/709.01, 709.08, 709.1, 709.11; 341/20, 22, 23; D14/115; 361/680, 683, 686; 400/485, 489

[56] References Cited

U.S. PATENT DOCUMENTS

| D. 376,356 | 12/1996 | Chung ..................................... D14/115 |
| D. 379,179 | 5/1997 | Kawauchi et al. ...................... D14/115 |
| D. 389,129 | 1/1998 | Guintoli ................................. D14/115 |
| 5,021,771 | 6/1991 | Lachman ................................ 345/167 |
| 5,374,588 | 12/1994 | Miller et al. .............................. 178/18 |
| 5,469,194 | 11/1995 | Clark et al. .............................. 345/173 |
| 5,504,500 | 4/1996 | Garthwaite et al. ..................... 345/164 |
| 5,543,588 | 8/1996 | Bisset et al. .............................. 178/18 |
| 5,546,334 | 8/1996 | Hsieh et al. .............................. 345/167 |
| 5,600,313 | 2/1997 | Freedman ................................. 345/161 |
| 5,694,123 | 12/1997 | Selker et al. ............................. 345/161 |
| 5,726,684 | 3/1998 | Blankenship et al. ................... 345/167 |
| 5,734,377 | 3/1998 | Fukuzaki ................................. 345/157 |

Primary Examiner—Regina Liang
Attorney, Agent, or Firm—Park & Vaughan

[57] ABSTRACT

One embodiment of the present invention provides a portable computing device comprising a housing including a keyboard. The embodiment also includes a first pointing device coupled to the housing, as well as a second pointing device coupled to the housing between the keyboard and a first edge of the housing. The embodiment additionally includes a plurality of buttons disposed on the housing so that at least one button is located between the first pointing device and the second pointing device, and at least one button is located between the glide point and the first edge of the housing. In another embodiment, the plurality of buttons is movably disposed on the housing so that when buttons are located in a first position, at least one button is located between the first pointing device and the second pointing device, and when buttons are located in a second position, at least one button is located between the second pointing device and the first edge of the housing. The term pointing devices refers to any manually operated input device that can be used to move a cursor around a computer display, such as a mouse, a track ball, a pointing stick or a glide point.

8 Claims, 10 Drawing Sheets

METHOD FOR PROVIDING BUTTONS FOR USE WITH MULTIPLE POINTING DEVICES ON A LAPTOP COMPUTER

RELATED APPLICATION

This application hereby incorporates by reference the following related non-provisional application by the same inventors as the instant application, and filed on the same day as the instant application: "Laptop With Buttons Configured for Use With Multiple Pointing Devices," having Ser. No. 08/937,211, and filing date Sep. 17, 1997.

BACKGROUND

1. Field of the Invention

The present invention relates to portable computing devices, and more particularly to laptop computers including multiple pointing devices, such as a pointing stick and a glide point, that are operated in concert with proximately located mouse buttons.

2. Related Art

As computer users increasingly navigate through window-based user interfaces, data input devices, such as a mouse, have become standard features on modem computer systems. These data input devices are typically used to move a cursor around a graphical display, and they typically include associated buttons, such as mouse buttons, which are used select and activate graphical objects located under the cursor.

Providing a data input device, such as a mouse, on a portable computing system presents a number of challenges. These portable computing devices, such as laptop computers, are often used on airplanes, buses or trains, where there is no room for an external pointing device such as a mouse to be used. Consequently, different types of pointing devices have been integrated into portable computers, including: pointing sticks, glide points and track balls. The term "pointing device" is used in the specification to refer to any manually operated input device that can be used to move a cursor around a computer display, this includes but is not limited to: a mouse, a track ball, a pointing stick and a glide point.

A pointing stick typically takes the form of a short stick, often with a rubber tip, protruding perpendicularly from the surface of the portable computer. It is often located between keys on a computer keyboard for easy accessibility. If force is applied to the pointing stick in a direction parallel to the surface of the portable computer, the pointing stick will pivot so as to specify a direction relative to the surface of the portable computer. This direction is typically used to move a cursor around the portable computer screen. The pointing stick is typically biased so that it returns to a position perpendicular to the surface of the portable computing device when released.

A glide point is another type of pointing device that typically takes the form of a plate embedded in the portable computer surface that is sensitive to the touch of a finger. A glide point can detect the finger through a variety of means, including capacitive sensors, resistance sensors and pressure sensors. A glide point is typically designed so that when a finger touches the glide point, associated circuitry determines a location on the plate where the finger touches the glide point surface. By "gliding" a finger along the glide point surface, a user can specify a velocity and a direction of travel for a cursor on a graphical display.

A track ball is another type of pointing device that typically takes the form of a ball disposed within a recess in the portable computing device so that the ball is able to freely rotate about its center. By rotating the ball in a particular direction, the user can specify a displacement of the cursor on the graphical display.

Pointing devices such as glide points, pointing sticks and track balls are typically used in conjunction with buttons, as are found on a mouse, to select graphical objects located under the cursor. These buttons are typically located near the pointing device so that the buttons can be operated by the same hand that controls the pointing device.

This gives rise to a problem for portable computing devices that include multiple pointing device, such as for example a pointing stick and a glide point. If the buttons are located near the glide point, the buttons cannot be easily manipulated by a hand while the hand operates the pointing stick. If the buttons are located near the pointing stick, the buttons cannot be easily manipulated by a hand while the hand operates the glide point.

What is needed is portable computing system with multiple pointing devices, such as a pointing stick and a glide point, that provides buttons that can easily be manipulated by a hand that is operating the pointing stick, as well as buttons that can be easily manipulated by a hand that is operating the glide point.

SUMMARY

One embodiment of the present invention provides a portable computing device comprising a housing including a keyboard. The embodiment also includes a first pointing device coupled to the housing, as well as a second pointing device coupled to the housing between the keyboard and a first edge of the housing. The embodiment additionally includes a plurality of buttons disposed on the housing so that at least one button is located between the first pointing device and the second pointing device, and at least one button is located between the glide point and the first edge of the housing. In another embodiment, the plurality of buttons is movably disposed on the housing so that when buttons are located in a first position, at least one button is located between the first pointing device and the second pointing device, and when buttons are located in a second position, at least one button is located between the second pointing device and the first edge of the housing. The term pointing devices refers to any manually operated input device that can be used to move a cursor around a computer display, such as a mouse, a track ball, a pointing stick or a glide point.

Thus, the present invention can be characterized as a portable computing device, comprising a housing and first and second pointing devices coupled to the housing. The portable computing device also may include a plurality of buttons disposed on the housing so that at least one can be operated by a hand while the hand operates the first pointing device, and at least one can be operated by the hand while the hand operates the second pointing device. In one embodiment, the first pointing device includes a pointing stick. In another embodiment, the second pointing device includes a glide point. In yet another embodiment, the second pointing device includes a track ball.

In another embodiment of the present invention, a button in the plurality of buttons disposed on the housing is movably disposed on the housing so that when the button is located in a first position, the button can be operated by a hand while the hand operates the first pointing device, and when the button is located in a second position the button can be operated by the hand while the hand operates the second pointing device.

In another embodiment of the present invention, the plurality of buttons includes a first pointing device button to be used in conjunction with the first pointing device, and a second pointing device button to be used in conjunction with the second pointing device. The portable computing device further includes a mechanism that determines which one of the first pointing device button and the second pointing device button is active based upon which one of the first pointing device and the second pointing device was most recently used.

In another embodiment of the present invention, the portable computing device includes a mechanism that determines which one of the first pointing device button and the second pointing device button is active based upon system configuration information located in the portable computing device.

One embodiment of the present invention can be characterized as data input module that is mountable on a portable computing device. One embodiment of the data input module includes: a module housing that is mountable on a portable computing device in a first position and a second position, as well as a second pointing device disposed on the module housing. This embodiment also includes a button disposed on the module housing so that when the module housing is mounted in the first position, the button is associated with a first pointing so that it can be operated by a hand while the hand operates the first pointing device. Furthermore, when the module housing is mounted in the second position, the button can be operated by the hand while the hand operates the second pointing device.

In one embodiment of the present invention, the data input module includes a plurality of module contacts disposed on the module housing for electrically coupling the second pointing device and the button to a plurality of computer contacts located on the portable computing device. These contacts are configured in such a way that module contacts communicate with a first set of computer contacts when the module housing is mounted in the first position, and the module contacts communicate with a second set of computer contacts when the module housing is mounted in the second position. This allows the portable computing device to ascertain whether the module housing is mounted in the first position by passing electrical signals through the plurality of computer contacts.

In another embodiment of the present invention, the data input module includes a contact surface that activates a switch disposed on the portable computer system when the data input module is mounted to the portable computer device in the first position. This allows the portable computer device to determine whether the data input module is mounted in the first position by examining the switch.

One embodiment of the present invention can be characterized as portable computing device, including: a housing; a first pointing device coupled to the housing; and a mounting surface on the housing adapted to receive a data input module, where the data input module includes a button and a second pointing device mounted on the data input module. The portable computing device additionally includes a plurality of computer contacts disposed on the mounting surface for receiving electrical signals from the button and the second pointing device on the data input module.

Another embodiment can be characterized as method for receiving user input in a portable computing system, which operates in a portable computing system, including: a housing, a first pointing device, a second pointing device, and a plurality of buttons disposed on the housing to receive user input. The method includes receiving input from a first button in the plurality of buttons associated with the first pointing device when the first pointing device is in use. This allows the first button to be operated by a hand while the hand operates the first pointing device. The method also includes receiving input from a second button in the plurality of buttons associated with the second pointing device when the second pointing device is in use. This allows the second button to be operated by a hand while the hand operates the second pointing device.

One embodiment of the present invention can be characterized as a method for configuring data input devices in a computer system. The method operates in a portable computer system including a housing and a removable data input module, where the data input module includes a mechanism to accept manually inputted data. The method includes removing the data input module in a first configuration from the housing; attaching the data input module to the housing in a second configuration; and inputting commands manually into the data input module.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of First Embodiment

Figure 1:
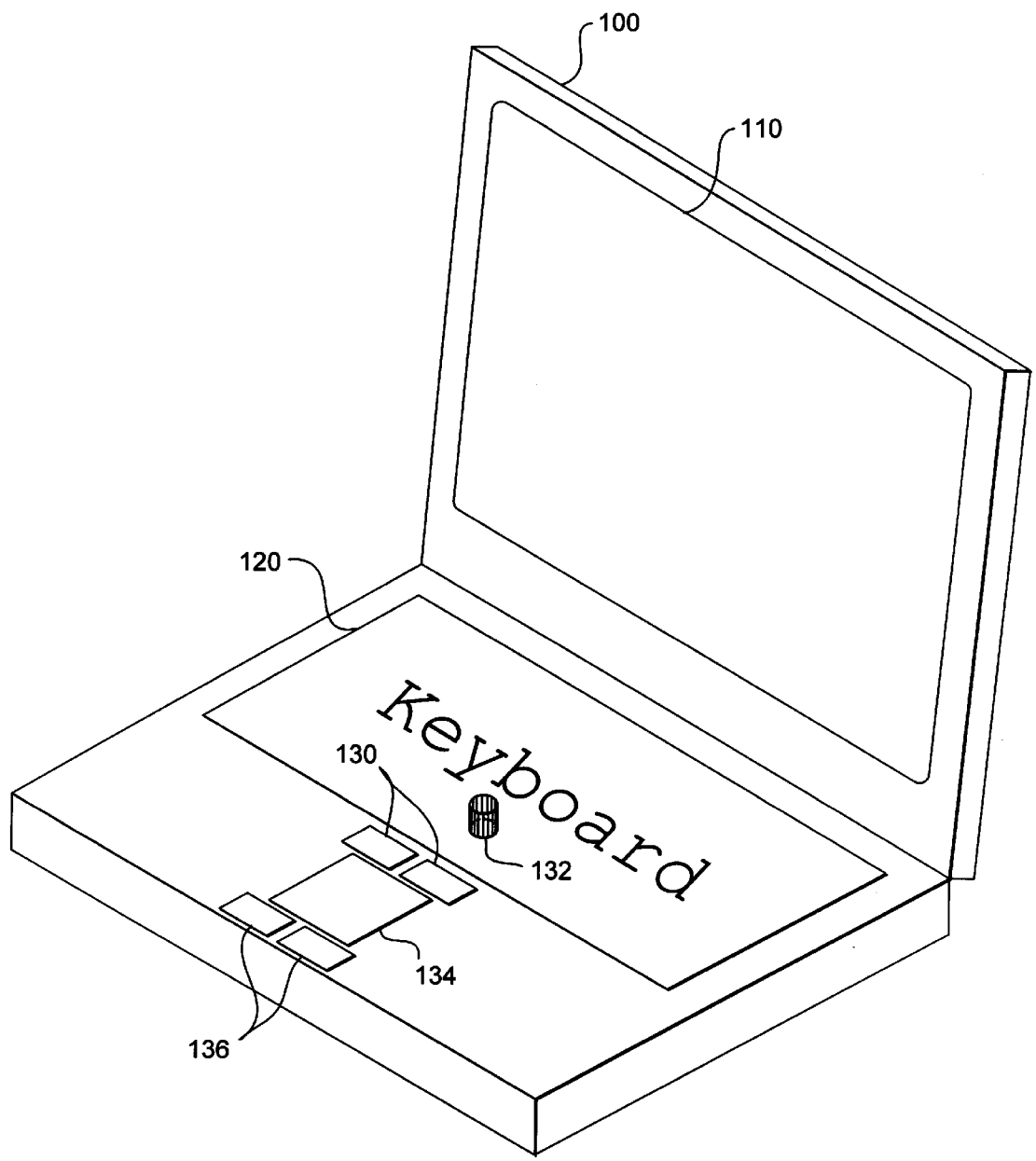
FIG. 1 illustrates portable computer 100 including pointing stick 132 and pointing stick buttons 130, as well as glide point 134 and glide point buttons 136 in accordance with an embodiment of the present invention.

FIG. 1 illustrates portable computer 100 including pointing stick 132 and pointing stick buttons 130, as well as glide point 134 and glide point buttons 136 in accordance with an embodiment of the present invention. Portable computer 100 may be any portable computing device, such as a laptop computer, a note book computer, or a palmtop computer, or a smaller personal organizer. Any type of computer system can be used so long as it makes use of a pointing device that is incorporated into the body of a computer system, such as pointing stick, a glide point or a track ball.

Portable computer 100 includes display 110, for displaying graphical and character output to a user, as well as keyboard 120, which accepts character-based input from the user. Portable computer 100 additionally includes two pointing devices for controlling the position of a cursor within display 110. These pointing devices may include pointing stick 132, which is located within keyboard 120, as well as glide point 134, which is located between keyboard 120 and an edge of portable computer 100.

These pointing devices have associated buttons to be used in concert with the pointing devices, in order to select and manipulate graphical and/or character objects located below an associated cursor on display 110. These may include pointing stick buttons 130 and glide point buttons 136. In this specification, mouse buttons are described as being "associated with" a pointing device. In one sense, this means that the buttons are conveniently located so that the buttons can be operated by a hand, while the hand operates the associated pointing device. For example, when pointing stick 132 is operated by an index finger or a middle finger of a hand, other fingers and the thumb can concurrently operate pointing stick buttons 130. Similarly, when glide point 134 is operated by an index finger or a middle finger of a hand, the other fingers and the thumb can concurrently operate glide point buttons 136. In another sense, the term "associated with" means to be used in conjunction with. For example, a pointing device can be used to move a cursor about a graphical display, while an associated button can be used to select and activate objects under the cursor.

Note that if two sets of buttons were not provided, such concurrent may not be possible using only a single hand. For example, if pointing stick buttons 130 were not provided, then a user would have a hard time operating pointing stick 132 concurrently with buttons 136 with a single hand because of the significant distance between pointing stick 132 and glide point buttons 136.

Description of Second Embodiment

Figure 2:
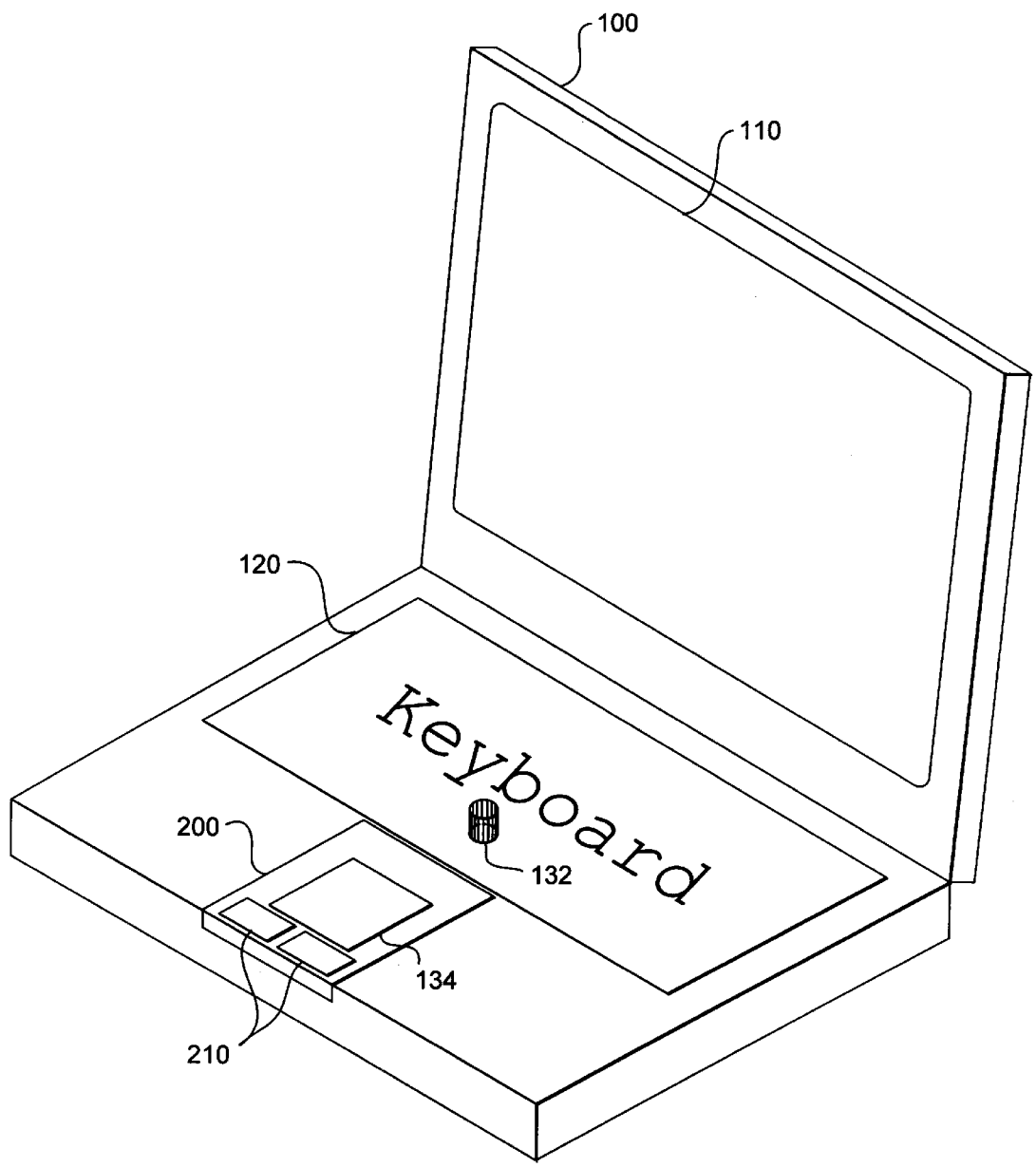
FIG. 2 illustrates portable computer 100 including data input module 200, which itself includes glide point 134 and buttons 210 in accordance with an embodiment of the present invention.

FIG. 2 illustrates portable computer 100 including data input module 200, which itself includes glide point 134 and buttons 210 in accordance with an embodiment of the present invention. Portable computer 100 illustrated in FIG. 2 is the same as portable computer 100 illustrated in FIG. 1, except that the system illustrated in FIG. 2 includes data input module 200 in place of: pointing stick buttons 130, glide point 134 and glide point buttons 136. Data input module 200 includes glide point 134, as well as buttons 210. Buttons 210 may be used in conjunction with glide point 134 in the configuration illustrated in FIG. 2.

Figure 3:
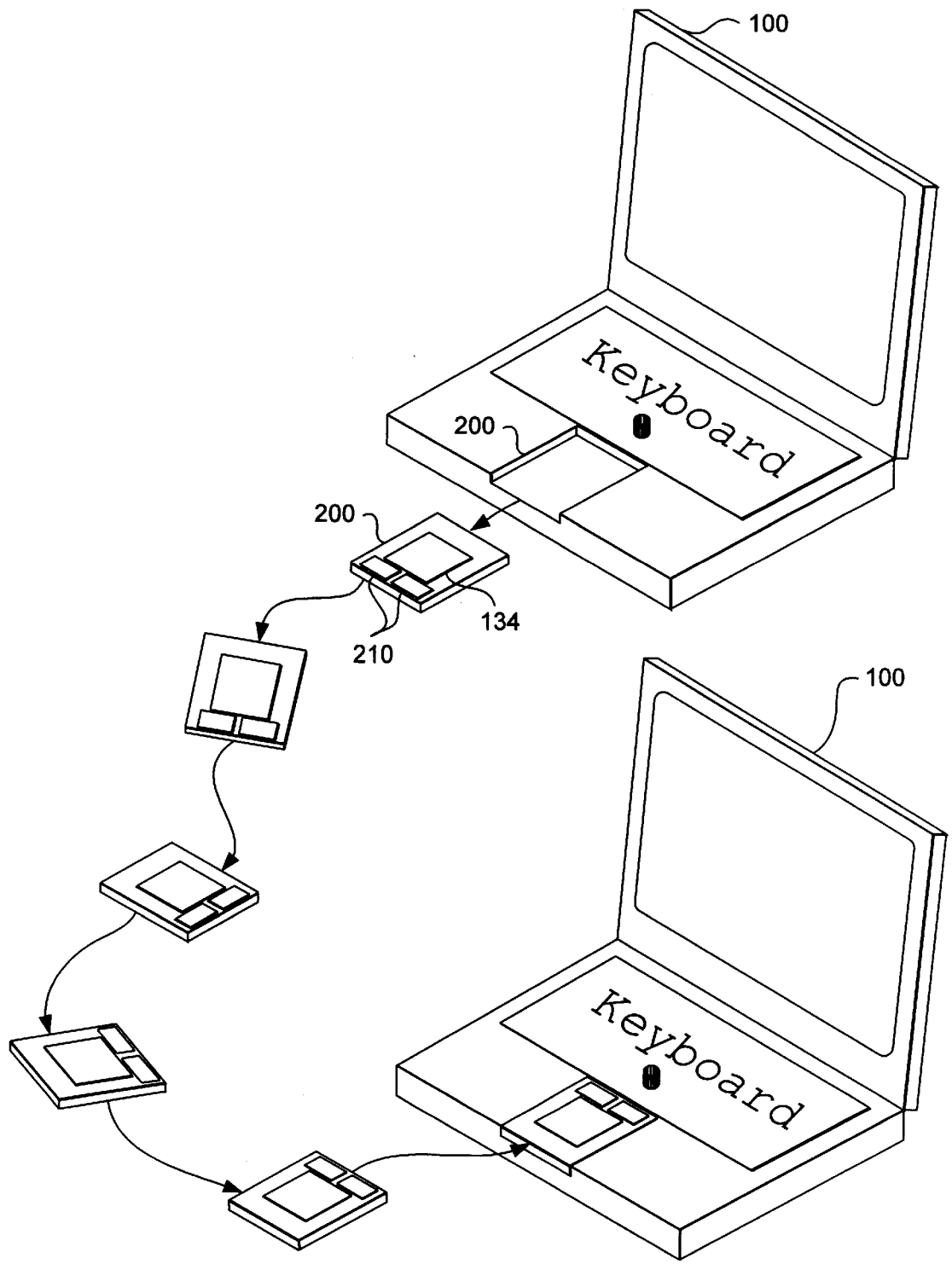
FIG. 3 illustrates how data input module 200 can be rotated so that buttons 210 are close proximity to pointing stick 132 or in close proximity to glide point 134 in accordance with an embodiment of the present invention.

Alternatively, as illustrated in FIG. 3, data input module 200 may be removed, rotated, and mounted on portable computer 100 in an alternate orientation, which places buttons 210 closer to pointing stick 132 to facilitate concurrent operation of the pointing stick 134 with buttons 210 by a single hand.

In the above embodiment, it is desirable that portable computer 100 be able to detect the orientation of data input module 200, so that the functions of buttons 210 may be reversed to compensate for the rotation of buttons 210, and so that glide point 134 may be disabled when data input module 200 is oriented to facilitate operation of buttons 210 with pointing device 132. Two different methods of accomplishing this are illustrated in FIGS. 4 and 5.

Figure 4:
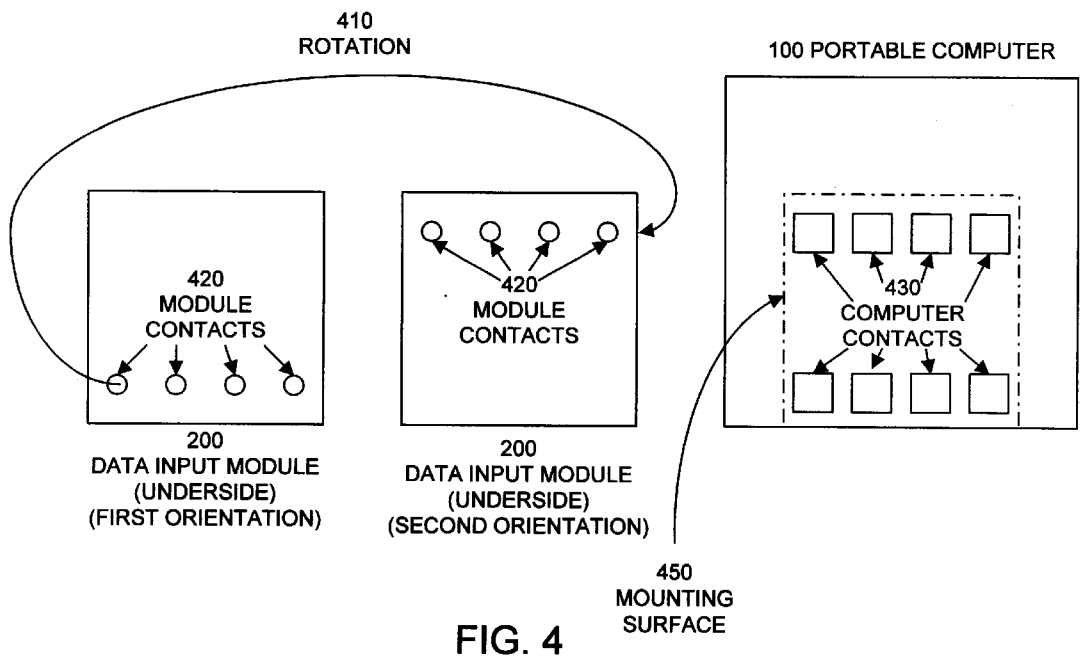
FIG. 4 illustrates how module contacts 420 on the underside of data input module 400 are oriented so as to receive computer contacts 450 in accordance with an embodiment of the present invention.
Figure 5:
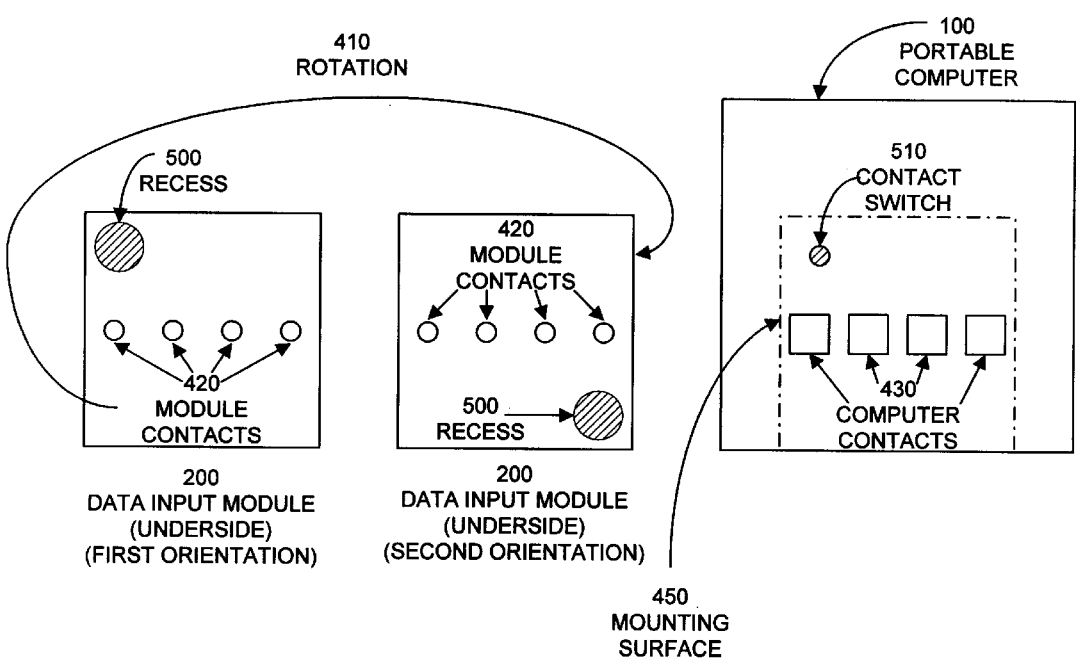
FIG. 5 illustrates how contact switch 510, which fits into a recess 500, can be used to determine an orientation of data input module 200 in accordance with an embodiment of the present invention.

FIG. 4 illustrates how module contacts 420 on the underside of a data input module 200 are oriented so as to receive sets of computer contacts 450 in two different configurations in accordance with an embodiment of the present invention. FIG. 4 illustrates the underside of data input module 200 in a first orientation and a second orientation. The underside of data input module 200 may include module contacts 420. FIG. 4 additionally illustrates a set of computer contacts 430 disposed on mounting surface 450 of portable computer 100. Module contacts 420 are designed to receive computer contacts 430 so as to electrically couple glide point 134 and buttons 210 on data input module 200 to circuitry within portable computer 100.

In a first orientation, module contacts 420 are near the lower edge of the underside of data input module 200. In this orientation, module contacts 420 receive a lower row of computer contacts 430. Data input module 200 can be rotated into a second orientation, in which module contacts 420 are near the upper edge of the underside of data input module 200. In this orientation, module contacts 420 receive an upper row of computer contacts 430. Portable computer 100 determines the orientation of data input module 100, by passing electrical signals through either the upper or lower row of computer contacts 430.

Other methods of detecting the orientation of data input module 200 are possible. FIG. 5 illustrates how contact switch 510, which fits into a recess 500, can be used to determine an orientation of data input module 200 in accordance with an embodiment of the present invention. In this embodiment, the underside of data input module 200 includes recess 500 in the upper left-hand corner, and a row of module contacts 420 located in the middle of the underside of data input module 200. When data input module 200 is rotated 410 into a second orientation, module contacts 420 remain in a row in the middle of the underside of data in input module 200. However, recess 500 is shifted to the lower right-hand corner. In this embodiment, mounting surface 450 on portable computer 100 includes a contact switch 510 in the upper right hand corner, and a single row of computer contacts 430 located in the middle of mounting surface 430.

By examining contact switch 510, portable computer 100 can determine the orientation of data input module 200. When data input module 200 is mounted to mounting surface 450 of portable computer 100 in a first orientation, recess 500 covers contact switch 510 so that contact switch 510 is not activated by data input module 200. When data input module 200 is mounted in a second orientation, recess 500 does not cover contact switch 510. Hence, contact switch 510 is activated by pressure from the surface of data input module 200. When contact switch 510 is activated, portable computer 100 knows data input module 200 is engaged in a second orientation.

In this embodiment, the orientation of data input module 200 determines whether or not the actions of buttons 210 are reversed to compensate for rotation of data input module 210. The orientation may additionally determine the way in which signals are routed through computer contacts 430, because computer contacts 430 connect to different module contacts 420 after data input module 400 has been rotated. Furthermore, the orientation of data input module 200 may determine whether or not glide point 134 on data input module 200 is active or not.

Data input module 200 may be attached to portable computer 100 through any conventional attachment means. In one embodiment, data input module 200 is slidably attached to portable computer 100 through set of matching grooves in data input module 200 and portable computer 100. In another embodiment, data input module 200 is attached to portable computer 200 by means of a latch. In yet another embodiment, data input module 200 is attached to portable computer 100 by a friction fitting.

Figure 6:
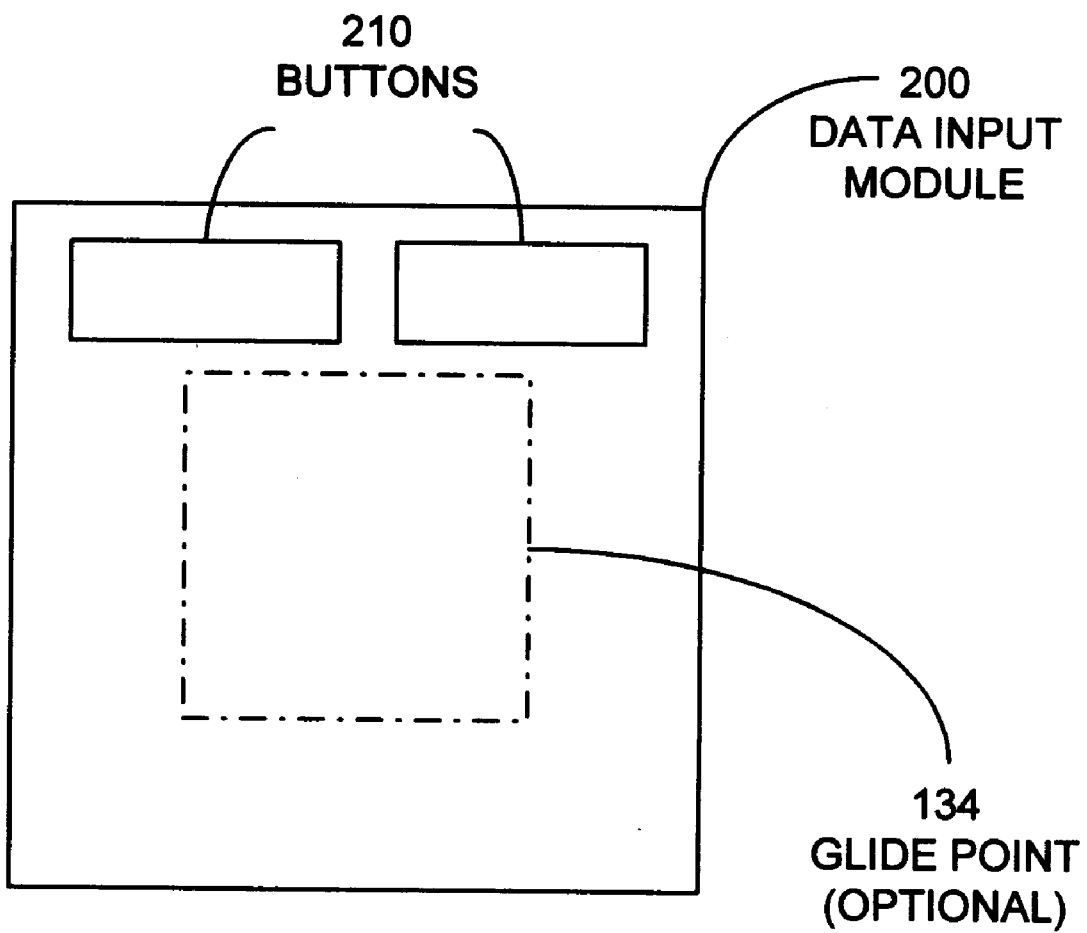
FIG. 6 is a diagram illustrating data input module 200 with optional glide point 134 in accordance with an embodiment of the present invention.

FIG. 6 is a diagram illustrating an embodiment of data input module 200 with an optional glide point 134 in accordance with an embodiment of the present invention. To save on the cost of a glide point, one embodiment of data input module 200 may include only buttons 210, and no glide point. In another embodiment, glide point 134 is included to allow for operation of portable computer 100 with both a glide point and a pointing stick.

Figure 7:
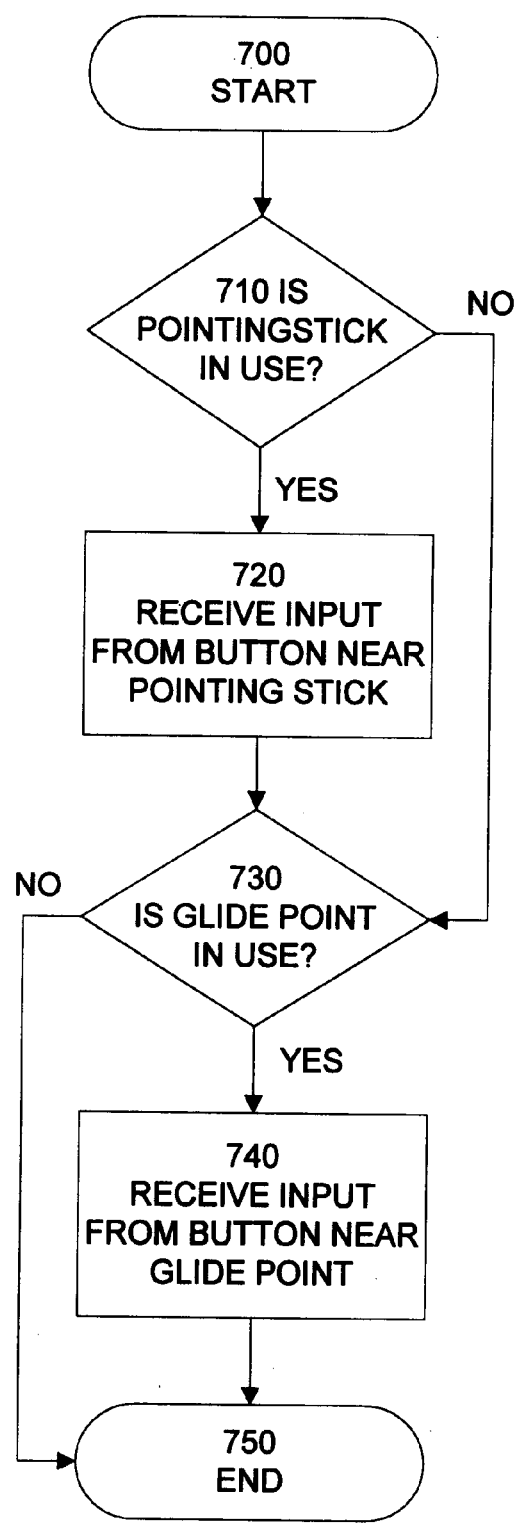
FIG. 7 is a flow chart illustrating how buttons are activated depending upon which pointing device is in use in accordance with an embodiment of the present invention.

FIG. 7 is a flow chart illustrating how buttons are activated depending upon which pointing device is in use in accordance with an embodiment of the present invention. This sequence of operations can be used in a system with separate glide point buttons 130 and pointing stick buttons 136, as is illustrated in FIG. 1. The system starts at state 700, which is a start state. The system next advances to state 710. In state 710, the system determines if the pointing stick is in use. If not, the system advances to state 730. If so, the system advances to state 720. At state 720, the system receives input from a button located near pointing stick 132. The system next advances to state 730. At state 730, the system determines whether glide point 134 is in use. If not, the system advances to state 750, which is an end state. If so the system advances to state 740, in which the system receives input from a button located near glide point 134. Note that although the system is shown with a start state 700 and an end state 750, the system may sequentially repeat states 700 through 750.

Figure 8:
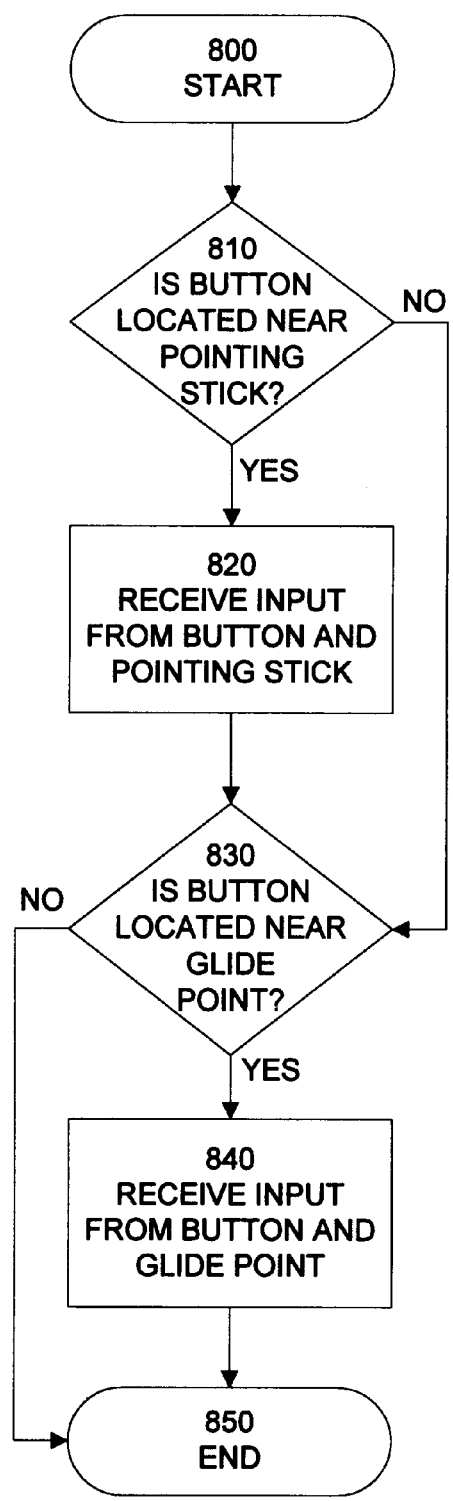
FIG. 8 is a flow chart illustrating how a button is activated depending upon the location of the button in accordance with an embodiment of the present invention.

FIG. 8 is a flow chart illustrating how a button is activated depending upon the location of the button in accordance with an embodiment of the present invention. This sequence of operations can be used in a system with movable buttons, as is illustrated in FIG. 2. The system starts at state 800, which is a start state. The system next advances to state 810. In state 810, the system determines if the button is associated with pointing stick 132. If not, the system advances to state 830. If so, the system advances to state 820. At state 820, the system receives input from the button and pointing stick 132. The system next advances to state 830. At state 830, the system determines whether the buttons is associated with glide point 134. If not, the system advances to state 850, which is an end state. If so the system advances to state 840, in which the system receives input from the button and glide point 134. Note that although the system is shown with a start state 800 and an end state 850, the system may sequentially repeat states 800 through 850.

Figure 9:
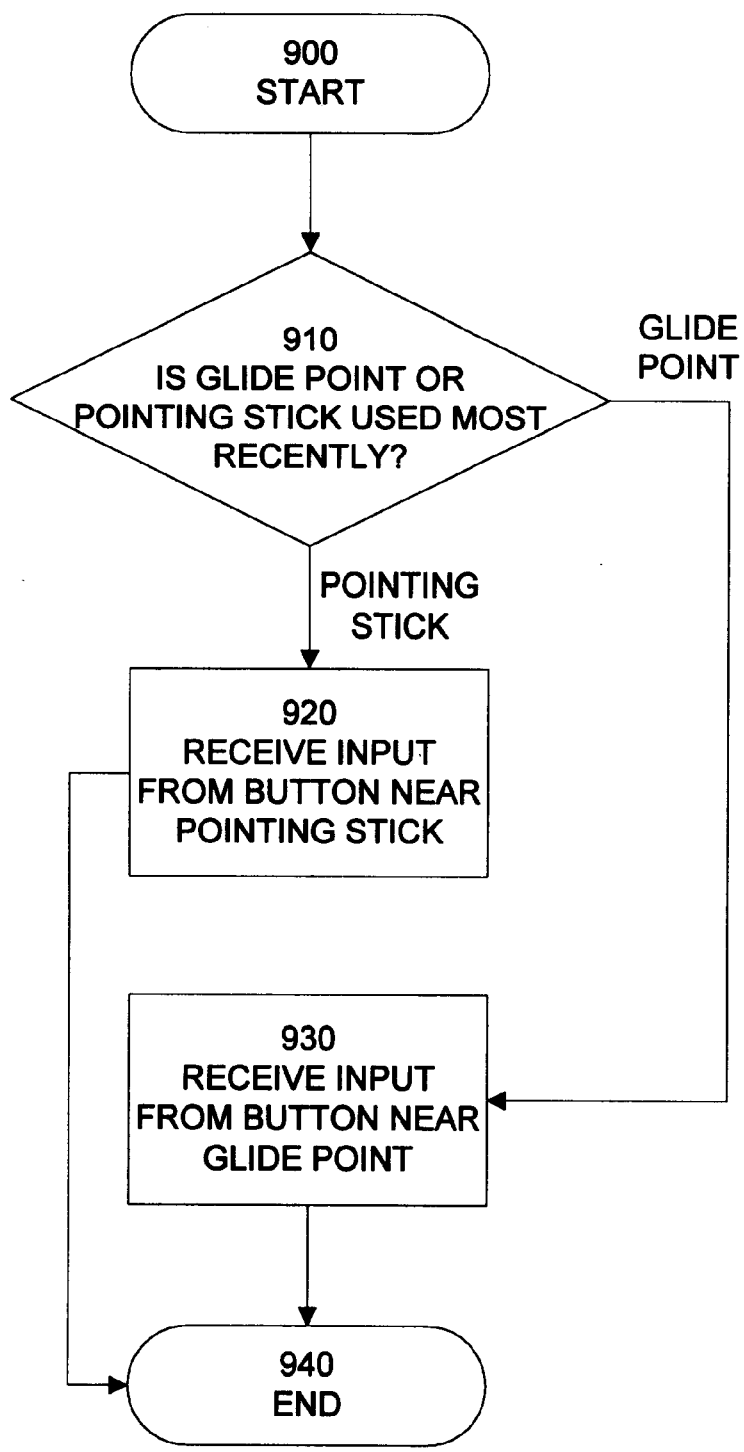
FIG. 9 is a flow chart illustrating how buttons are activated depending upon which button was most recently used in accordance with an embodiment of the present invention.

FIG. 9 is a flow chart illustrating how buttons are activated depending upon which button was most recently used in accordance with an embodiment of the present invention. This sequence of operations can be used in a system with separate glide point buttons 130 and pointing stick buttons 136, as is illustrated in FIG. 1. The system starts at state 900, which is a start state. The system next advances to state 910. In state 910, the system determines whether pointing stick 132 or the glide point 134 was most recently used. If glide point 134 was most recently used, the system advances to state 930. If pointing stick was most recently used, the system advances to state 920. At state 920, the system receives input from a button near pointing stick 132. The system next advances to state 940, which is an end state. At state 930, the system receives input from a button near glide point 134. Note that although the system is shown with a start state 900 and an end state 940, the system may sequentially repeat states 900 through 940.

Figure 10:
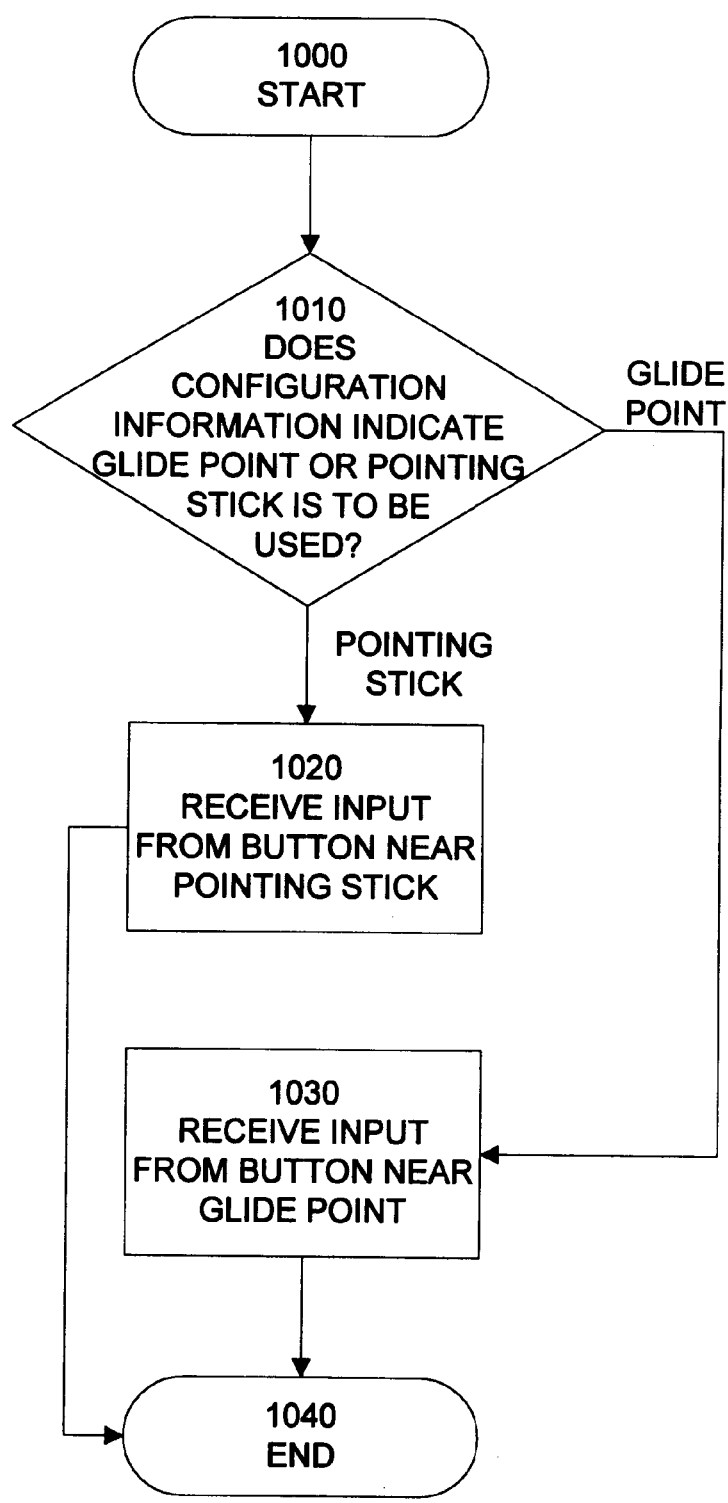
FIG. 10 is a flow chart illustrating how buttons are activated based upon system configuration information in accordance with an embodiment of the present invention.

FIG. 10 is a flow chart illustrating how buttons are activated based upon system configuration information in accordance with an embodiment of the present invention. This sequence of operations can be used in a system with separate glide point buttons 130 and pointing stick buttons 136, as is illustrated in FIG. 1. The system starts at state 1000, which is a start state. The system next advances to state 1010. In state 1010, the system examines system configuration information stored within portable computer 100 to determine whether pointing stick 132 or the glide point 134 is to be used. If glide point 134 is to be used, the system advances to state 1030. If pointing stick is to be used, the system advances to state 1020. At state 1020, the system receives input from a button near pointing stick 132. The system next advances to state 1040, which is an end state. At state 1030, the system receives input from a button near glide point 134. Note that although the system is shown with a start state 1000 and an end state 1040, the system may sequentially repeat states 1000 through 1040.

Figure 11:
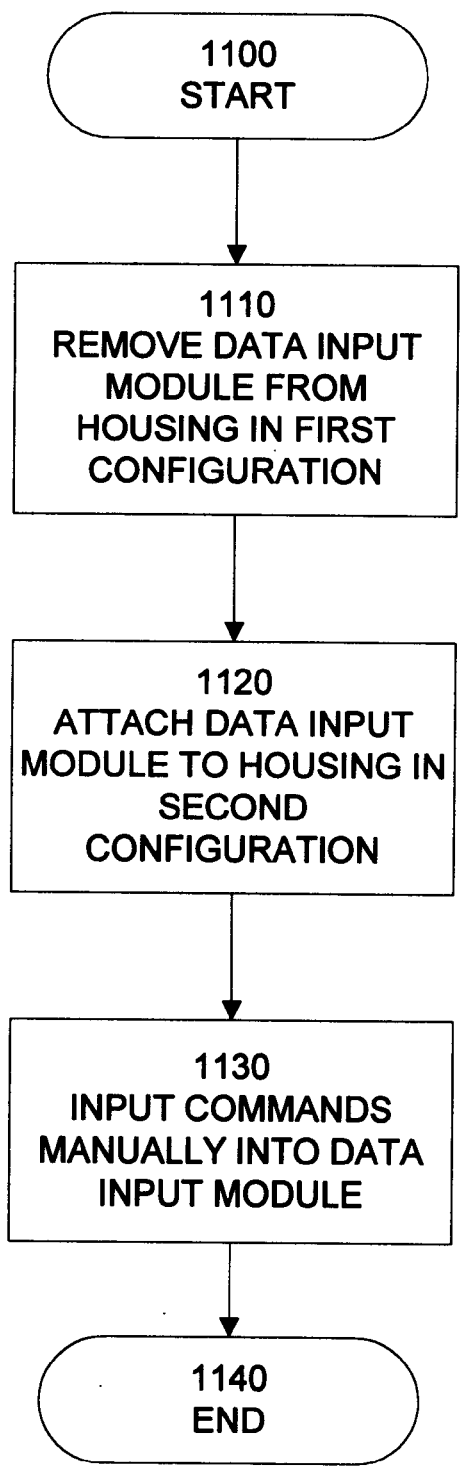
FIG. 11 is a flow chart illustrating a method of removing data input module 200 and reattaching it in another configuration in accordance with an embodiment of the present invention.

FIG. 11 is a flow chart illustrating a method of removing data input module 200 and reattaching it in another configuration in accordance with an embodiment of the present invention. This sequence of operations can be used in a system with movable buttons, as is illustrated in FIG. 2. The user starts at state 1100, which is a start state. The user then advances to state 1110. In state 1110, the user removes data input module 200 from a first configuration on portable computer 100. The user then advances to state 1120. At state 1120, the user attaches data input module 200 to portable computer system 100 in a second configuration. In one embodiment, this second configuration is rotated from the first configuration as is illustrated in FIG. 3. In another embodiment, data input module 200 is translated, and attached to portable computer 100 at a different location. The user then advances to state 1030. At state 1030, the user inputs commands manually into portable computer system 100 through data input module 200. The user then advances to state 1140, which is an end state. Note that although the system is shown with a start state 1100 and an end state 1140, the system may sequentially repeat states 1100 through 1140.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. A method for configuring data input devices in a portable computer, the method comprising:

fixedly mounting a rectangular data input module into a rectangular mounting cavity in a housing of the portable computer in a first orientation so that a button on the rectangular input module can be used with a first pointing device located on the housing of the portable computer;

removing the rectangular data input module from the housing;

rotating the rectangular data input module 180 degrees;

fixedly mounting the rectangular data input module into the rectangular mounting cavity in the housing in a second orientation so that the button on the rectangular input module can be used with a second pointing device located on the rectangular data input module; and inputting commands manually into the data input module.

2. The method of claim 1, wherein the inputting of commands into the data input module includes operating a button.

3. The method of claim 1, wherein the inputting of commands into the data input module includes operating a glide point.

4. The method of claim 1, wherein the inputting of commands into the data input module includes operating a track ball.

5. The method of claim 1, wherein the inputting of commands into the data input module includes operating a pointing stick.

6. The method of claim 1, further comprising:

receiving input from the first pointing device and the second pointing device;

keeping track of which pointing device is most recently used;

if the first pointing device is most recently used, receiving input from a button associated with the first pointing device while ignoring input from a button associated with the second pointing device; and if the second pointing device is most recently used, receiving input from the button associated with the second pointing device while ignoring input from the button associated with the first pointing device.

7. The method of claim 1, further comprising:

receiving input from a keyboard disposed on the housing; and displaying an output to a display disposed on the housing.

8. The method of claim 1, further comprising:

determining if configuration information stored in the portable computer indicates that the first pointing device or the second pointing device is to be used;

if the first pointing device is to be used, receiving input from a button associated with the first pointing device; and if the second pointing device is to be used, receiving input from a button associated with the second pointing device.

* * * * *